(12) United States Patent
Yang

(10) Patent No.: US 9,322,532 B2
(45) Date of Patent: Apr. 26, 2016

(54) LAMP

(71) Applicant: Hangzhou LM energysolution lighting Co., Ltd., Hangzhou, Zhejiang (CN)

(72) Inventor: Limin Yang, Zhejiang (CN)

(73) Assignee: Hangzhou LMenergysolution Lighting Co., Ltd, Hangzhou, Zhejiang (CN)

( * ) Notice: Subject to any disclaimer, the term of this patent is extended or adjusted under 35 U.S.C. 154(b) by 63 days.

(21) Appl. No.: 14/489,293

(22) Filed: Sep. 17, 2014

(65) Prior Publication Data

US 2015/0078003 A1   Mar. 19, 2015

(30) Foreign Application Priority Data

Sep. 17, 2013  (CN) .......................... 2013 2 0576636

(51) Int. Cl.
*F21V 19/02* (2006.01)
*F21V 19/00* (2006.01)
*F21V 23/00* (2015.01)
*F21Y 101/02* (2006.01)
*F21Y 103/00* (2006.01)

(52) U.S. Cl.
CPC ............. *F21V 19/02* (2013.01); *F21V 19/0055* (2013.01); *F21V 23/006* (2013.01); *F21Y 2101/02* (2013.01); *F21Y 2103/003* (2013.01)

(58) Field of Classification Search
CPC ... F21V 19/0055; F21V 23/006; F21V 19/02; F21Y 2101/02; F21Y 2103/003
USPC ...................................... 362/398, 219, 249.02
See application file for complete search history.

(56) References Cited

U.S. PATENT DOCUMENTS

| | | | | |
|---|---|---|---|---|
| 7,648,251 B2 * | 1/2010 | Whitehouse | ........... | A47B 97/00 362/133 |
| 8,317,444 B1 * | 11/2012 | Hensley | ................. | F16B 35/04 411/107 |
| 8,534,864 B2 * | 9/2013 | Forteza | .................... | F21V 19/00 362/223 |
| 2013/0250523 A1 * | 9/2013 | Lai | ...................... | H01L 23/4006 361/720 |

* cited by examiner

*Primary Examiner* — Laura Tso

(57) ABSTRACT

A lamp includes: a lamp circuit board, wherein two power input/output terminals are respectively provided on two side of the lamp circuit board; a lighting element, wherein the lighting element is mounted on the lamp circuit board for being driven and lightened; a plurality of magnetic parts connected to the lamp circuit board, so as to detachably and magnetically attaching the lamp circuit board by the magnetic parts, wherein the magnetic part is connected to the lamp circuit board by a bolt and a nut, and a spring is placed between the bolt and the nut for supporting; and a connecting wire comprising a cable and two plugs respectively mounted at two ends of the cable, wherein one of the plugs is connected to a power supplier and the other plug is connected to the power input/output terminal for supplying the lamp.

20 Claims, 4 Drawing Sheets

LAMP

CROSS REFERENCE OF RELATED APPLICATION

The present invention claims priority under 35 U.S.C. 119 (a-d) to CN 201320576636.1, filed Sep. 17, 2013.

BACKGROUND OF THE PRESENT INVENTION

1. Field of Invention

The present invention relates to a lighting system, and more particularly to a lamp.

2. Description of Related Arts

Application of fluorescent lamp has a history of nearly one hundred years, the main principle is that vacuum discharge excites fluorescent powder, the light source is developed from the early T12 to T10, T9 and T8, the luminous efficiency is greatly improved. In recent years, T5 and T6 have been developed. Compared with the T8, luminous efficiency of the T5 and T6 is increased by 30%. With the development of new light source LED, efficiency is improved by 50-80% when compared with T8 fluorescent light. Conventionally, a lot of fluorescent lamps are still using T8, and a lot of T12 fluorescent lamps are still in use. People want to update the lamp to use new light source for saving energy.

According to the conventional energy saving updating products, T5 and LED light sources are used, and both are supplied with a lamp holder of a T8 lamp (which is similar to the replacement of a light source). However, transforming of T8 lamp circuit is needed, which takes a lot of manpower, and has hidden safety problems. In order to quickly and safely updating T8 and T12 lamps, and make the updated lamp safer, a lamp according to the present invention is provided.

Furthermore, for updating the conventional fluorescent lamp, T5 lighting element or LED lighting element is utilized for replacing T8 lighting element. T8 holder is utilized for power supplying, wherein circuit thereof is adjusted. As a result, more time is cost and the circuit is not safe.

Therefore, the conventional lamp may cause high maintenance cost and strict installing requirements.

SUMMARY OF THE PRESENT INVENTION

An object of the present invention is to provide a lamp for overcoming disadvantages of conventional lamps.

Another object of the present invention is to provide a lamp for reducing costs, simplifying maintenance, and lowering installing requirements.

Another object of the present invention is to provide a lamp which is more energy-saving, easier to use, and easier to install.

Accordingly, in order to accomplish the above objects, the present invention provides a lamp, comprising:

a lamp circuit board, wherein two power input/output terminals are respectively provided on two side of the lamp circuit board, for inputting power to the lamp circuit board, and outputting power from the lamp circuit board, wherein the power input/output terminals are connected in parallel;

a lighting element, wherein the lighting element is mounted on the lamp circuit board for being driven and lightened;

a plurality of magnetic parts connected to the lamp circuit board, so as to detachably and magnetically attaching the lamp circuit board by the magnetic parts, wherein the magnetic part is connected to the lamp circuit board by a bolt and a nut, and a spring is placed between the bolt and the nut for supporting, in such a manner that by adjusting a screwed depth of the bolt, an install angle and an install height of the lamp circuit board when being attached are adjusted for changing a light direction of the lamp; and a connecting wire comprising a cable and two plugs respectively mounted at two ends of the cable, wherein one of the plugs is connected to a power supplier and the other plug is connected to the power input/output terminal for supplying the lamp.

Preferably, the lamp further comprises:

a holder, wherein the lamp circuit board is mounted on the holder; and a fixer, wherein the fixer is mounted on a target place, and the holder is mounted on the fixer for being mounted on the target place.

Preferably, the fixer has a fixing slot corresponding to a bottom portion of the holder, in such a manner that the holder is inserted into the fixing slot for being mounted; the magnetic part is mounted on the fixer by the bolt and the nut, in such a manner that the magnetic part is connected to the lamp circuit board with the fixer and the holder.

Preferably, the lamp further comprises: a cover covering the lamp circuit board, wherein the cover is transparent in such a manner that light from the lighting element passes through the cover.

Preferably, the cover is ivory-white with an anti-dazzle function, a cross-section of the cover is a circular arc no less than 270 degree, and the lighting element is placed at a bottom of the circular arc, in such a manner that a lighting angle of the lamp is up to 270 degree.

Preferably, the lamp further comprises: two end caps mounted at two ends of the holder, wherein the end cap has an input/output terminal connected to the power input/output terminal of the lamp circuit board, the plug of the connecting wire is inserted into the input/output terminal, in such a manner that the plug is connected to the power input/output terminal through the end cap.

Preferably, the lamp further comprises a driving circuit board, wherein the end cap is connected to the lamp circuit board through the driving circuit board, the driving circuit board cooperates with the lamp circuit board for driving the lighting element, and provides functions comprising circuit protection.

Preferably, the driving circuit board is mounted in a driving circuit board slot on the holder, the lamp circuit board is mounted in a lamp circuit board slot on the holder.

Preferably, the power supplier is an alternating current power source with a terminal for being inserted by the plug.

Preferably, the power supplier is a direct current power source with a terminal for being inserted by the plug, a magnet is mounted under the power supplier.

Preferably, the plug is connected to the power supplier through another the lamp which is connected to the power supplier for supplying the lamp.

Preferably, the holder is made of an iron alloy, a cobalt alloy, or a nickel alloy, in such a manner that the magnetic parts are magnetically attached on the holder.

Preferably, the holder comprises a magnet mounted thereon, in such a manner that the magnetic parts are magnetically attached on the holder.

Preferably, the lighting element is a T5 lighting element.

Preferably, the lighting element is an LED lighting element.

With the foregoing structure, a plurality of the lamps are able to be connected in series for using only one power source. Furthermore, the lamp circuit board is able to be magnetically attached on the holder, and the holder is able to be magnetically attached on the target place. Therefore, the lamp circuit board is easy to be detached from the holder, and the holder is easy to be detached from the target place, which means that the lamp and parts thereof are easy to be replaced. With the spring placed between the lamp circuit board and the magnetic part, the light direction of the lamp is adjustable.

Therefore, compared with the conventional lamps, the lamp according to the present invention has advantages as: reducing costs, simplifying maintenance, and lowering installing requirements. And the lamp is more energy-saving, easier to use, and easier to install.

These and other objectives, features, and advantages of the present invention will become apparent from the following detailed description, the accompanying drawings, and the appended claims.

DETAILED DESCRIPTION OF THE PREFERRED EMBODIMENT

Figure 1:
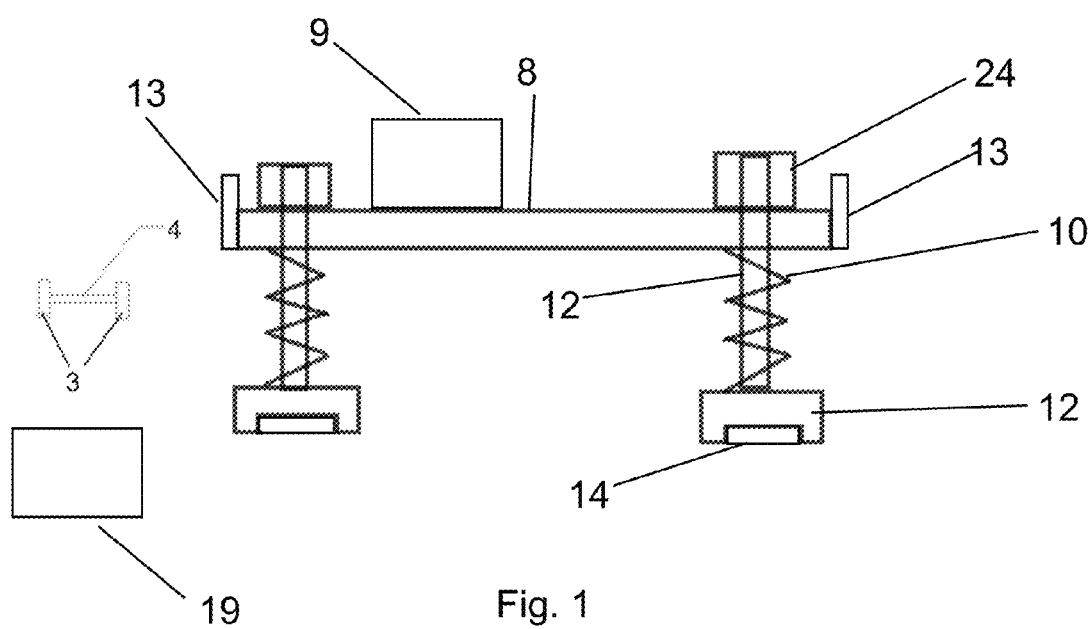
FIG. 1 is a structural view of a lamp according to a preferred embodiment 1 of the present invention.
Figure 2:
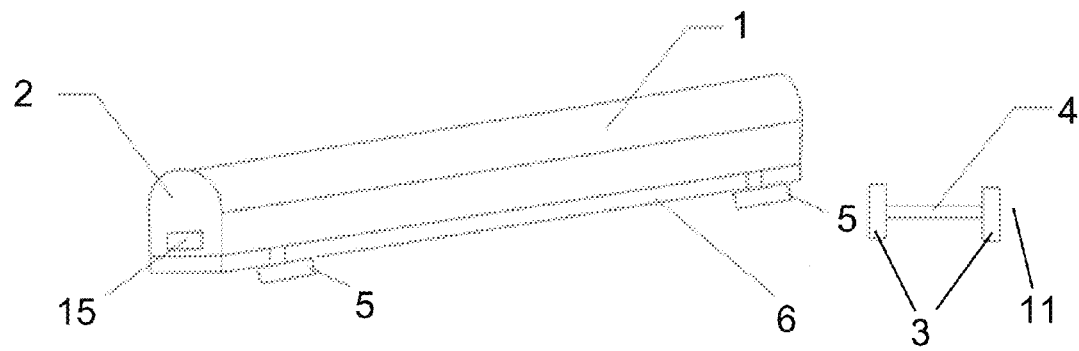
FIG. 2 is a perspective view of a lamp according to a preferred embodiment 2 of the present invention.
Figure 3:
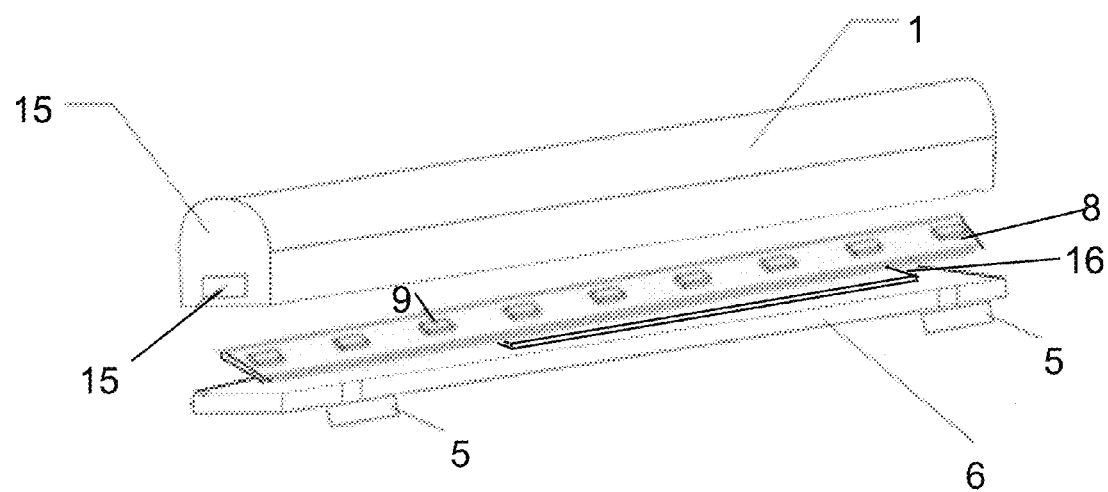
FIG. 3 is an exploded view of the lamp according to the preferred embodiment 2 of the present invention.
Figure 4:
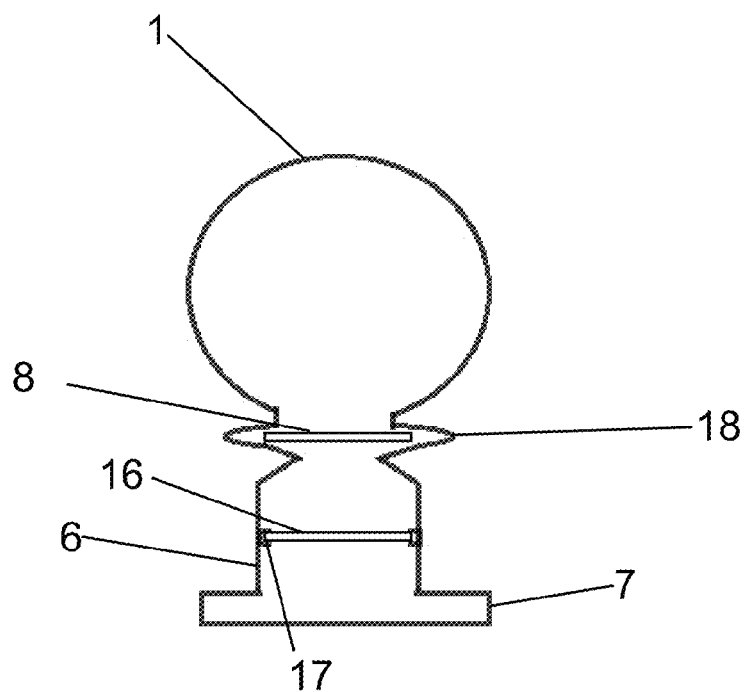
FIG. 4 is a sectional view of the lamp according to a preferred embodiment 3 of the present invention.
Figure 5:
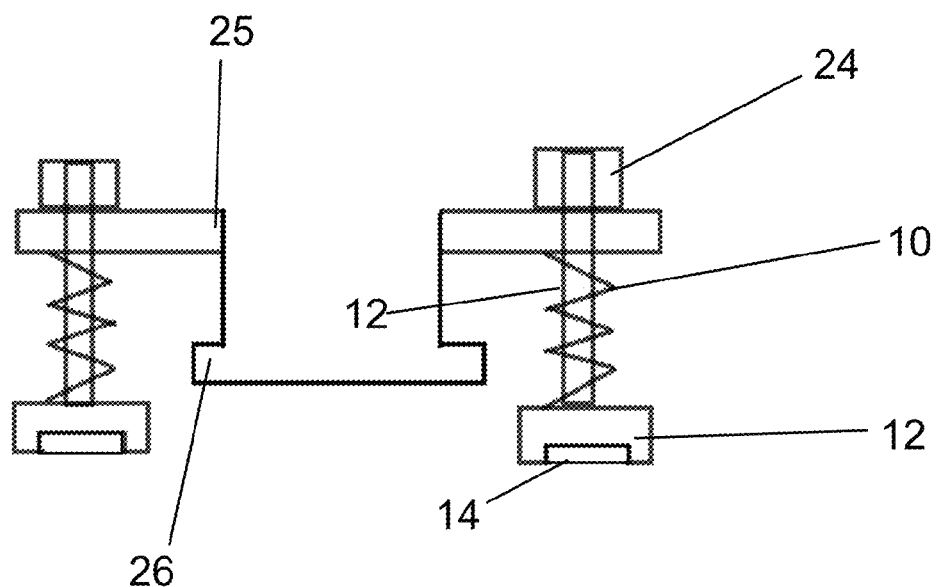
FIG. 5 is a structural view of a fixer according to the preferred embodiment 3 of the present invention.
Figure 6:
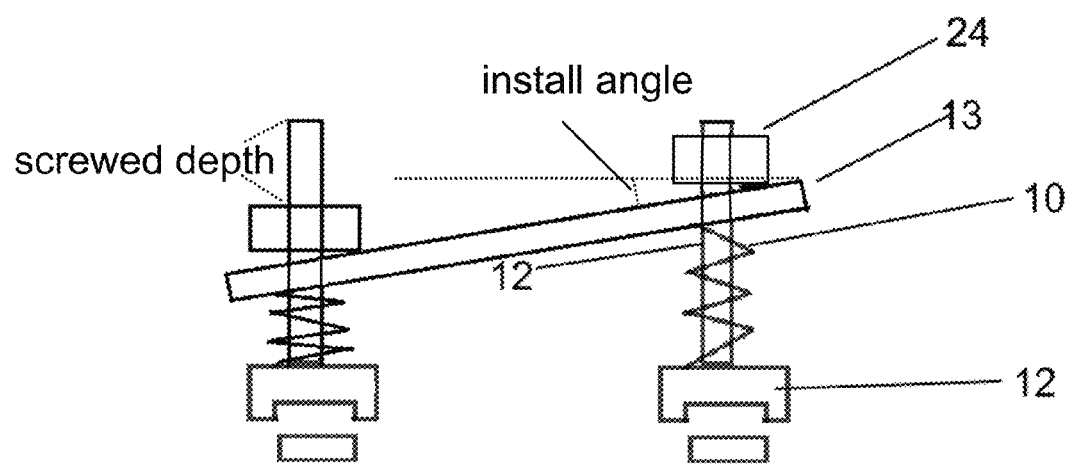
FIG. 6 is a structural view of the lamp according to the preferred embodiment 1 of the present invention.

Referring to FIG. 1 to FIG. 6 of the drawings, a lamp according to preferred embodiments of the present invention is illustrated.

Preferred Embodiment 1

A lamp is provided, comprising:

a lamp circuit board 8, wherein two power input/output terminals 13 are respectively provided on two side of the lamp circuit board 8, for inputting power to the lamp circuit board 8, and outputting power from the lamp circuit board 8, wherein the power input/output terminals 13 are connected in parallel;

a lighting element 9, wherein the lighting element 9 is a T5 lighting element or an LED lighting element and is mounted on the lamp circuit board 8 for being driven and lightened;

a plurality of magnetic parts 14 connected to the lamp circuit board 8, in such a manner that the lamp circuit board 8 is detachably and magnetically attached on a holder of a conventional T8 fluorescent lamp or a T12 fluorescent lamp by the magnetic parts 14, wherein the magnetic part 14 is connected to the lamp circuit board 8 by a bolt 12 and a nut 24, and a spring 10 is placed between the bolt 12 and the nut 24 for supporting, in such a manner that by adjusting the bolt 12, an install angle and an install height of the lamp circuit board 8 when being attached to the holder 6 are adjusted for changing a light direction of the lamp; and a connecting wire 11 comprising a cable 4 and two plugs 3 respectively mounted at two ends of the cable 4, wherein one of the plugs 3 is connected a power supplier 19 and the other plug 3 is connected the power input/output terminal 13 for supplying the lamp, wherein the power supplier has a safe-output function, a magnet 20 is mounted on the power supplier, in such a manner that the power supplier is also able to be attached.

The power supplier 19 is a direct current power source with a terminal for being inserted by the plug, and the magnet 20 is mounted under said power supplier, wherein a rated output power of the power supplier is 36V DC.

With the foregoing structures, a plurality of the lamps are able to be connected in series for using only one power source. Furthermore, the lamp circuit board 8 is magnetically attached on the target place. Therefore, the lamp circuit board 8 is easy to be detached from the target, which means that the lamp and parts thereof are easy to be replaced. With the spring 10 placed between the lamp circuit board 8 and the magnetic part 14, the light direction of the lamp is adjustable.

For updating a conventional T8 or T12 fluorescent lamp, a T8 or T12 lighting element is take out. Then the lamp circuit board 8 and the power supplier 19 according to the present invention are attached to a holder of the T8 or T12 fluorescent lamp. The lamp is supplied by the power supplier 19, and circuits of the T8 and T12 fluorescent lamp are not used, which saves time and is safer. In addition, a plurality of the lamp circuit board 8 is able to be connected in series by the connecting wire 11 for improving a lighting effect.

Preferred Embodiment 2

A lamp is provided, comprising:

a lamp circuit board 8, wherein two power input/output terminals 13 are respectively provided on two side of the lamp circuit board 8, for inputting power to the lamp circuit board 8, and outputting power from the lamp circuit board 8, wherein the power input/output terminals 13 are connected in parallel;

a lighting element 9, wherein the lighting element 9 is a T5 lighting element or an LED lighting element and is mounted on the lamp circuit board 8 for being driven and lightened;

a plurality of magnetic parts 14 connected to the lamp circuit board 8, in such a manner that the lamp circuit board 8 is detachably and magnetically attached on a holder of a conventional T8 fluorescent lamp or a T12 fluorescent lamp by the magnetic parts 14, wherein the magnetic part 14 is connected to the lamp circuit board 8 by a bolt 12 and a nut 24, and a spring 10 is placed between the bolt 12 and the nut 24 for supporting, in such a manner that by adjusting the bolt 12, an install angle and an install height of the lamp circuit board 8 when being attached to the holder 6 are adjusted for changing a light direction of the lamp; and a connecting wire 11 comprising a cable 4 and two plugs 3 respectively mounted at two ends of the cable 4, wherein one of the plugs 3 is connected a power supplier 19 and the other plug 3 is connected the power input/output terminal 13 for supplying the lamp.

The lamp further comprises:

a holder 6, wherein the lamp circuit board 8 is mounted on the holder 6; and a fixer 5, wherein the fixer 5 is mounted on a target place, and the holder 6 is mounted on the fixer for being mounted on the target place.

The lamp further comprises: a cover 1 covering the lamp circuit board 8, wherein the cover 1 is transparent in such a manner that light from the lighting element 9 passes through the cover 1.

The lamp further comprises: two end caps 2, wherein the end cap 2 has an input/output terminal 15 connected to the power input/output terminal 13 of the lamp circuit board 8, the plug 3 of the connecting wire 11 is inserted into the input/output terminal 15, in such a manner that the plug 3 is connected to the power input/output terminal 13 through the end cap 2.

The lamp further comprises a driving circuit board 16, wherein the end cap 2 is connected to the lamp circuit board 8 through the driving circuit board 16, the driving circuit board 16 cooperates with the lamp circuit board 8 for driving the lighting element 9, and provides functions comprising circuit protection.

The lighting element is a T5 lighting element or an LED lighting element.

With the foregoing structures, a plurality of the lamps are able to be connected in series for using only one power source. Furthermore, the lamp circuit board 8 is able to be magnetically attached on the holder 6, and the holder 6 is able to be magnetically attached on the target place. Therefore, the lamp circuit board 8 is easy to be detached from the holder 6, and the holder 6 is easy to be detached from the target place, which means that the lamp and parts thereof are easy to be replaced. With the spring 10, the light direction of the lamp is adjustable.

Preferred Embodiment 3

A lamp is provided, comprising:

a lamp circuit board 8, wherein two power input/output terminals 13 are respectively provided on two side of the lamp circuit board 8, for inputting power to the lamp circuit board 8, and outputting power from the lamp circuit board 8, wherein the power input/output terminals 13 are connected in parallel;

a lighting element 9, wherein the lighting element 9 is a T5 lighting element or an LED lighting element and is mounted on the lamp circuit board 8 for being driven and lightened;

a plurality of magnetic parts 14 connected to the lamp circuit board 8, in such a manner that the lamp circuit board 8 is detachably and magnetically attached on a holder of a conventional T8 fluorescent lamp or a T12 fluorescent lamp by the magnetic parts 14, wherein the magnetic part 14 is connected to the lamp circuit board 8 by a bolt 12 and a nut 24, and a spring 10 is placed between the bolt 12 and the nut 24 for supporting, in such a manner that by adjusting the bolt 12, an install angle and an install height of the lamp circuit board 8 when being attached to the holder 6 are adjusted for changing a light direction of the lamp; and a connecting wire 11 comprising a cable 4 and two plugs 3 respectively mounted at two ends of the cable 4, wherein one of the plugs 3 is connected a power supplier 19 and the other plug 3 is connected the power input/output terminal 13 for supplying the lamp.

The lamp further comprises:

a holder 6, wherein the lamp circuit board 8 is detachably and magnetically attached on the holder 6 by the magnetic parts 14; and two fixers 5, wherein the fixer 5 is mounted on a target place, and the holder 6 is mounted on the fixers for being mounted on the target place.

Each of the fixers 5 has a fixing slot 26 corresponding to a bottom portion 7 of the holder 6, in such a manner that the holder 6 is inserted into the fixing slot 26 for being mounted; two magnetic part 14 are mounted on each fixer 5 by the bolts 18 and the nuts 24, in such a manner that the magnetic part 14 is connected to the lamp circuit board 8 with the fixers 5 and the holder 6. By respectively adjusting the screwed depths of the four bolts 18 (wherein each fixer 5 has two bolts 18), an install angle and an install height of the lamp are adjusted for changing the light direction.

The lamp further comprises: a cover 1 covering the lamp circuit board 8, wherein the cover 1 is transparent in such a manner that light from the lighting element 9 passes through the cover 1.

The cover 1 is ivory-white with an anti-dazzle function, and a cross-section of the cover 1 is a circular arc no less than 270 degree, and the lighting element is placed at a bottom of the circular arc, in such a manner that a lighting angle of the lamp is up to 270 degree.

The lamp further comprises: two end caps 2, wherein the end cap 2 has an input/output terminal 15 connected to the power input/output terminal 13 of the lamp circuit board 8, the plug 3 of the connecting wire 11 is inserted into the input/output terminal 15, in such a manner that the plug 3 is connected to the power input/output terminal 13 through the end cap 2.

The lamp further comprises a driving circuit board 16, wherein the end cap 2 is connected to the lamp circuit board 8 through the driving circuit board 16, the driving circuit board 16 cooperates with the lamp circuit board 8 for driving the lighting element 9, and provides functions comprising circuit protection.

The driving circuit board 16 is mounted in a driving circuit board slot 17 on the holder 6, the lamp circuit board 8 is mounted in a lamp circuit board slot 18 on the holder 6.

The lighting element 9 is an LED lighting element.

With the foregoing structures, a plurality of the lamps are able to be connected in series for using only one power source. Furthermore, the lamp circuit board 8 is magnetically attached on the holder 6, and the holder 6 is magnetically attached on the target place. Therefore, the lamp circuit board 8 is easy to be detached from the holder 6, and the holder 6 is easy to be detached from the target place, which means that the lamp and parts thereof are easy to be replaced. With the spring 10, the light direction of the lamp is adjustable.

For updating a conventional T8 or T12 fluorescent lamp, a T8 or T12 lighting element is take out. Then the lamp according to the present invention is attached to a holder of the T8 fluorescent lamp by the fixer 5. And a power plug of the T8 or T12 fluorescent lamp or an individual power supplier is inserted into the input/output terminal 15 for supplying the lamp.

The lamp circuit board with the lighting element has a rated current of 150 ma, a rated voltage of 36V, a rated light quantity of 540 lm, and a rated power of 5.4 w. When a working current is 60 ma, a detected light quantity thereof is 396 lm, and a power thereof is 2.16 w. By utilizing a power supplier with a rated voltage of 36V and a rated current of 900 ma, six lamp circuit boards working with a current of 150 ma, or fifteen lamp circuit boards working with a current of 60 ma are able to be supplied. For six lamp circuit boards, a total light quantity is 3240 lm. For fifteen lamp circuit boards, a total light quantity is 5940 lm. Therefore, with a certain power supplier, the total light quantity is increased by adding the lamp circuit board. However, a total consumed power is still 36v*900 ma=32.4 w, which enlarges a development space for energy-saving lighting technology.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A lamp, comprising:
   a lamp circuit board, wherein two power input/output terminals are respectively provided on two side of said lamp circuit board, for inputting power to said lamp circuit board, and outputting power from said lamp circuit board, wherein said power input/output terminals are connected in parallel;
   a lighting element, wherein said lighting element is mounted on said lamp circuit board for being driven and lightened;
   a plurality of magnetic parts connected to said lamp circuit board, so as to detachably and magnetically attaching said lamp circuit board by said magnetic parts, wherein said magnetic part is connected to said lamp circuit board by a bolt and a nut, and a spring is placed between said bolt and said nut for supporting, in such a manner that by adjusting a screwed depth of said bolt, an install angle and an install height of said lamp circuit board when being attached are adjusted for changing a light direction of said lamp; and
   a connecting wire comprising a cable and two plugs respectively mounted at two ends of said cable, wherein one of said plugs is connected to a power supplier and the other plug is connected to said power input/output terminal for supplying said lamp.

2. The lamp, as recited in claim 1, further comprising:
   a holder, wherein said lamp circuit board is mounted on said holder; and
   a fixer, wherein said fixer is mounted on a target place, and said holder is mounted on said fixer for being mounted on the target place.

3. The lamp, as recited in claim 2, wherein said fixer has a fixing slot corresponding to a bottom portion of said holder, in such a manner that said holder is inserted into said fixing slot for being mounted; said magnetic part is mounted on said fixer by said bolt and said nut, in such a manner that said magnetic part is connected to said lamp circuit board with said fixer and said holder.

4. The lamp, as recited in claim 1, further comprising: a cover covering said lamp circuit board, wherein said cover is transparent in such a manner that light from said lighting element passes through said cover.

5. The lamp, as recited in claim 2, further comprising: a cover covering said lamp circuit board, wherein said cover is transparent in such a manner that light from said lighting element passes through said cover.

6. The lamp, as recited in claim 4, wherein said cover is ivory-white with an anti-dazzle function, a cross-section of said cover is a circular arc no less than 270 degree, and said lighting element is placed at a bottom of said circular arc, in such a manner that a lighting angle of said lamp is up to 270 degree.

7. The lamp, as recited in claim 5, wherein said cover is ivory-white with an anti-dazzle function, a cross-section of said cover is a circular arc no less than 270 degree, and said lighting element is placed at a bottom of said circular arc, in such a manner that a lighting angle of said lamp is up to 270 degree.

8. The lamp, as recited in claim 2, further comprising: two end caps mounted at two ends of said holder, wherein said end cap has an input/output terminal connected to said power input/output terminal of said lamp circuit board, said plug of said connecting wire is inserted into said input/output terminal, in such a manner that said plug is connected to said power input/output terminal through said end cap.

9. The lamp, as recited in claim 5, further comprising: two end caps mounted at two ends of said holder for mounting said cover on said holder, wherein said end cap has an input/output terminal connected to said power input/output terminal of said lamp circuit board, said plug of said connecting wire is inserted into said input/output terminal, in such a manner that said plug is connected to said power input/output terminal through said end cap.

10. The lamp, as recited in claim 8, further comprising a driving circuit board, wherein said end cap is connected to said lamp circuit board through said driving circuit board, said driving circuit board cooperates with said lamp circuit board for driving said lighting element, and provides functions comprising circuit protection.

11. The lamp, as recited in claim 9, further comprising a driving circuit board, wherein said end cap is connected to said lamp circuit board through said driving circuit board, said driving circuit board cooperates with said lamp circuit board for driving said lighting element, and provides functions comprising circuit protection.

12. The lamp, as recited in claim 10, wherein said driving circuit board is mounted in a driving circuit board slot on said holder, said lamp circuit board is mounted in a lamp circuit board slot on said holder.

13. The lamp, as recited in claim 11, wherein said driving circuit board is mounted in a driving circuit board slot on said holder, said lamp circuit board is mounted in a lamp circuit board slot on said holder.

14. The lamp, as recited in claim 1, wherein said power supplier is an alternating current power source with a terminal for being inserted by said plug.

15. The lamp, as recited in claim 1, wherein said power supplier is a direct current power source with a terminal for being inserted by said plug, a magnet is mounted under said power supplier.

16. The lamp, as recited in claim 1, wherein said plug is connected to said power supplier through another said lamp which is connected to said power supplier for supplying said lamp.

17. The lamp, as recited in claim 16, wherein said power supplier has a constant output power and voltage, in such a manner that when a plurality of said lamps are connected, a total consumed power is constant, while a total light quantity is increased.

18. The lamp, as recited in claim 2, wherein said holder is made of an iron alloy, a cobalt alloy, or a nickel alloy, in such a manner that said magnetic parts are magnetically attached on said holder.

19. The lamp, as recited in claim 2, wherein said holder comprises a magnet mounted thereon, in such a manner that said magnetic parts are magnetically attached on said holder.

20. The lamp, as recited in claim 1, wherein said lighting element is a T5 lighting element or an LED lighting element.

* * * * *